(12) United States Patent
Banks, Jr. et al.

(10) Patent No.: US 9,949,435 B2
(45) Date of Patent: Apr. 24, 2018

(54) EQUIPMENT PROTECTION USING A GRAIN TANK LEVEL SENSOR

(71) Applicants: CNH Industrial America LLC, New Holland, PA (US); Michael A. Conrad, Lititz, PA (US); William M. McCully, Lancaster, PA (US); Clayton E. Banks, Brownstown, PA (US)

(72) Inventors: Clayton E. Banks, Jr., Brownstown, PA (US); Michael A. Conrad, Lititz, PA (US); William M. McCully, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/035,128

(22) PCT Filed: Nov. 7, 2014

(86) PCT No.: PCT/US2014/064511
§ 371 (c)(1),
(2) Date: May 6, 2016

(87) PCT Pub. No.: WO2015/069993
PCT Pub. Date: May 14, 2015

(65) Prior Publication Data
US 2016/0286723 A1    Oct. 6, 2016

Related U.S. Application Data

(60) Provisional application No. 61/901,912, filed on Nov. 8, 2013.

(51) Int. Cl.
*G06F 7/70* (2006.01)
*A01D 41/127* (2006.01)
(Continued)

(52) U.S. Cl.
CPC ..... *A01D 41/1275* (2013.01); *A01D 41/1208* (2013.01); *A01D 41/1226* (2013.01);
(Continued)

(58) Field of Classification Search
CPC .............. A01D 41/1275; A01D 41/127; A01D 41/1277; A01D 41/1272; A01D 41/1226;
(Continued)

(56) References Cited

U.S. PATENT DOCUMENTS 5,957,773 A * 9/1999 Olmsted ............ A01D 41/1208
460/149
6,692,352 B2 * 2/2004 Gerber ............... A01D 41/1226
460/119
(Continued)

FOREIGN PATENT DOCUMENTS

EP    1523872 A1    4/2005

*Primary Examiner* — Robert E Pezzuto
(74) *Attorney, Agent, or Firm* — Patrick M. Sheldrake

(57) ABSTRACT

A grain tank level sensing system for a combine which harvests grain. The combine includes an upwardly open grain tank fillable with harvested grain and a cover that is displaceable for closing off the open grain tank. An actuator displaces the cover between an open and close position and either single or dual ultrasonic sensors continuously detect the level of grain in the tank and generate a signal proportional to the level of grain in the grain tank. A control system receives the signal from the ultrasonic sensors and generates an indication of the level in the tank to a monitor and/or disables the actuator to initiate the closing function when the grain tank is full.

9 Claims, 3 Drawing Sheets

(51) Int. Cl.
*A01D 41/12* (2006.01)
*G01F 23/296* (2006.01)
*E05F 15/70* (2015.01)
*A01D 34/04* (2006.01)
*A01D 61/00* (2006.01)
*A01F 7/06* (2006.01)
*A01F 12/44* (2006.01)
*A01F 12/46* (2006.01)

(52) U.S. Cl.
CPC ............ *E05F 15/70* (2015.01); *G01F 23/296* (2013.01); *A01D 34/04* (2013.01); *A01D 41/1243* (2013.01); *A01D 61/008* (2013.01); *A01F 7/06* (2013.01); *A01F 12/446* (2013.01); *A01F 12/46* (2013.01); *E05Y 2400/30* (2013.01); *E05Y 2900/518* (2013.01)

(58) Field of Classification Search
CPC ............ A01D 41/1208; A01D 41/1243; A01D 61/008; A01D 34/04; A01F 25/14; A01F 12/50; A01F 7/06; A01F 12/446; A01F 12/46; G05D 1/0291; G01F 23/296; E05F 15/70
USPC ....... 56/10.2 B, 10.2 R, 16.6, 473.5, 10.213; 141/114, 231, 98; 460/7, 119, 149; 701/50
See application file for complete search history.

(56) References Cited

U.S. PATENT DOCUMENTS

| | | | |
|---|---|---|---|
| 7,388,810 B2 | 6/2008 | Campbell | |
| 7,585,214 B1* | 9/2009 | Johnson | A01D 41/1226 460/119 |
| 7,877,181 B2* | 1/2011 | Chervenka | A01D 41/1275 460/119 |
| 8,032,255 B2* | 10/2011 | Phelan | A01D 41/1275 700/281 |
| 8,789,563 B2* | 7/2014 | Wenzel | A01F 25/14 141/114 |
| 8,944,898 B2* | 2/2015 | Barnes | A01D 41/1226 460/119 |
| 9,072,227 B2* | 7/2015 | Wenzel | A01F 12/50 |
| 2006/0240884 A1 | 10/2006 | Klimmer | |

* cited by examiner

EQUIPMENT PROTECTION USING A GRAIN TANK LEVEL SENSOR

This application is the US National Stage filing of International Application Serial No. PCT/US2014/064511 filed on Nov. 7, 2014 which claims priority to U.S. Provisional Application 61/901,912 filed Nov. 8, 2013, each of which is incorporated herein by reference in its entirety.

BACKGROUND OF THE INVENTION

1. Field of the Invention

The present invention relates to agricultural harvesters, and, more specifically to harvesters for grain and protection of harvesting equipment.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Grain tanks for combines are often fitted with powered covers or extension that may be electrically, hydraulically or pneumatically powered. These covers or extensions can be linked to other movable grain tank components. If these components are moved when the grain tank is in a totally full position, damage to the equipment can result.

The possibility for the operator of the combine to determine whether the grain tank is full becomes a challenge when the operator is focused on navigating the combine and its harvesting components properly through a field. Some current combines provide a method of determining grain tank fullness by a transparent window, but this requires frequent distraction from the forward direction of the combine. Other approaches utilize contact sensors to provide a reading of the fullness of the tank depending upon how far up in the tank the contact sensor is located. Frequently these sensors are at three quarters and full capacity. While this somewhat serves the purpose of determining fullness, it does not give the operator an indication of how rapidly the tank is being filled, which would enable the operator to coordinate with a transport vehicle.

While some approaches have utilized non-contact sensors, they do not coordinate the sensors with the fullness of the tank to provide equipment protection.

An additional limitation of the prior art non-contact sensors, especially in the case of ultrasonic non-contact sensors, is that the grain tank is made from highly reflective structural sheet steel so that the ultrasonic waves sent out to determine distance of the pile have multiple reflections when the grain tank is nearing its empty condition. On top of this, existing ultrasonic sensors have a dead band or a minimum distance to the sensor. Any closer than that, a measurement cannot be taken. Such a condition imposes installation problems because of the need for the sensor to be close to the highest point on a combine which can encroach on height limitations based on the overall equipment.

Accordingly what is needed in the art is a simplified and effective way of providing equipment protection for a grain tank of a combine.

Additionally, what is needed in the art is a more effective ultrasonic sensor that measures the height of grain within a grain tank.

SUMMARY OF THE INVENTION

The present invention provides for effective and efficient combine equipment protection.

The present invention also provides for more accurate sensing of the quantity of grain within the grain tank.

The present invention additionally provides for a more compact overall relationship for the combine.

In one form, the invention is a grain tank level sensing system for a combine for harvesting grain. The combine includes an upwardly open grain tank fillable with harvested grain. A cover is actuatable for closing off the opened grain tank. An actuator displaces the cover between an open and closed position. An ultrasonic sensor continuously detects the level of grain in the grain tank and generates a signal proportional to the level of the grain in the tank. A control system controls the actuator to displace the cover between its open and closed position with the control system being responsive to a signal from the ultrasonic sensor indicating a full grain tank to disable the actuator and prevent movement of the cover to the closed position for equipment protection.

In another form, the invention is a grain tank level sensing system for a combine which harvests grain. The combine includes an upwardly open grain tank fillable with harvested grain. At least a pair of ultrasonic sensors is positioned to sense the grain level in the tank and generate a signal proportional to the level of grain in the tank. The sensors are electrically interconnected so that one sensor generates an ultrasonic signal and the other receives the generated signal whereby the signal processing time is minimized.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
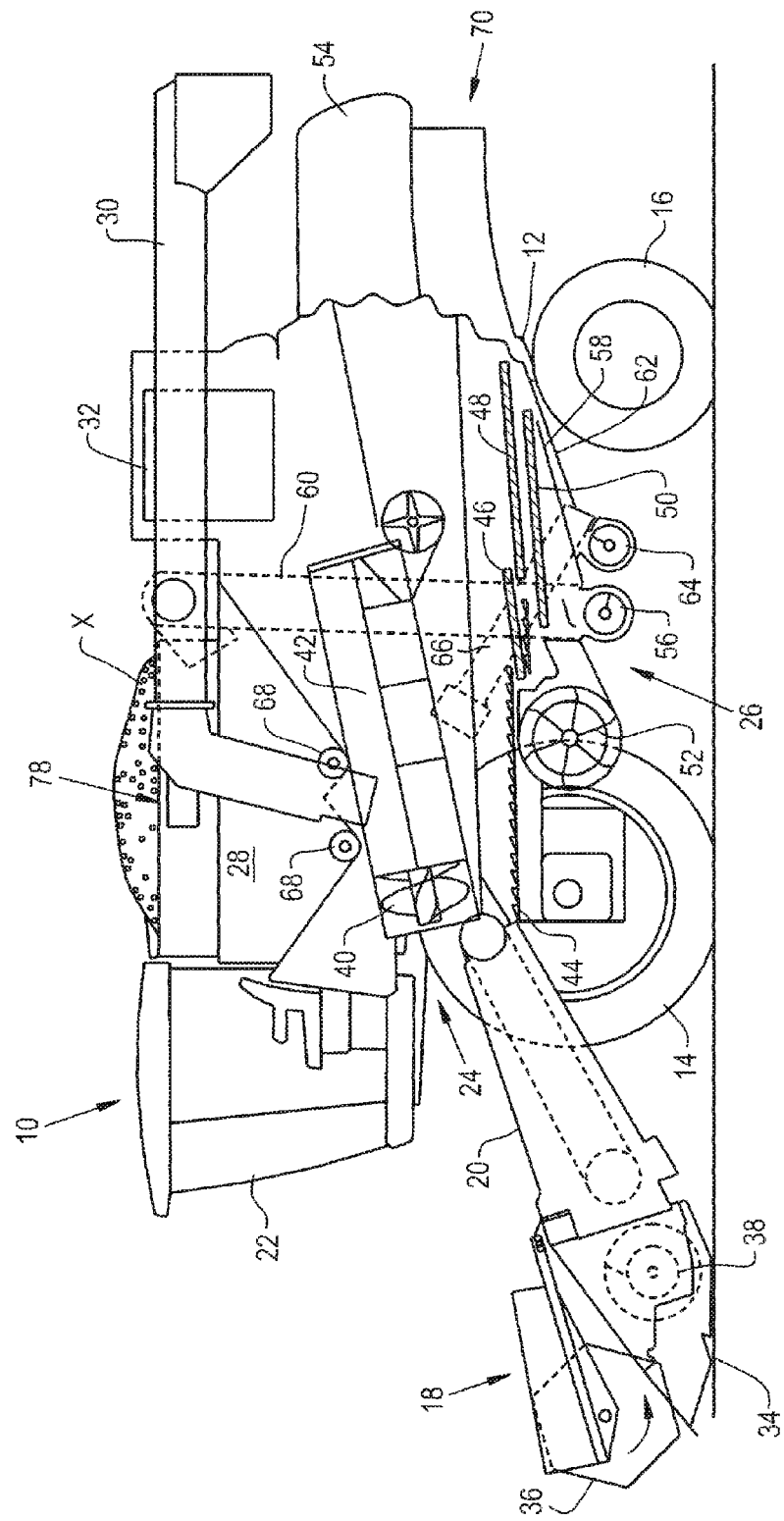
FIG. 1 is a side view of an embodiment of an agricultural harvester in the form of a combine which includes an embodiment of an equipment protection system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings pan 62. The tailings are transported via tailings auger 64 and return auger 66 to the upstream end of cleaning system 26 for repeated cleaning action. Grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper, counter knives, a windrow door and a residue spreader.

Figure 2:
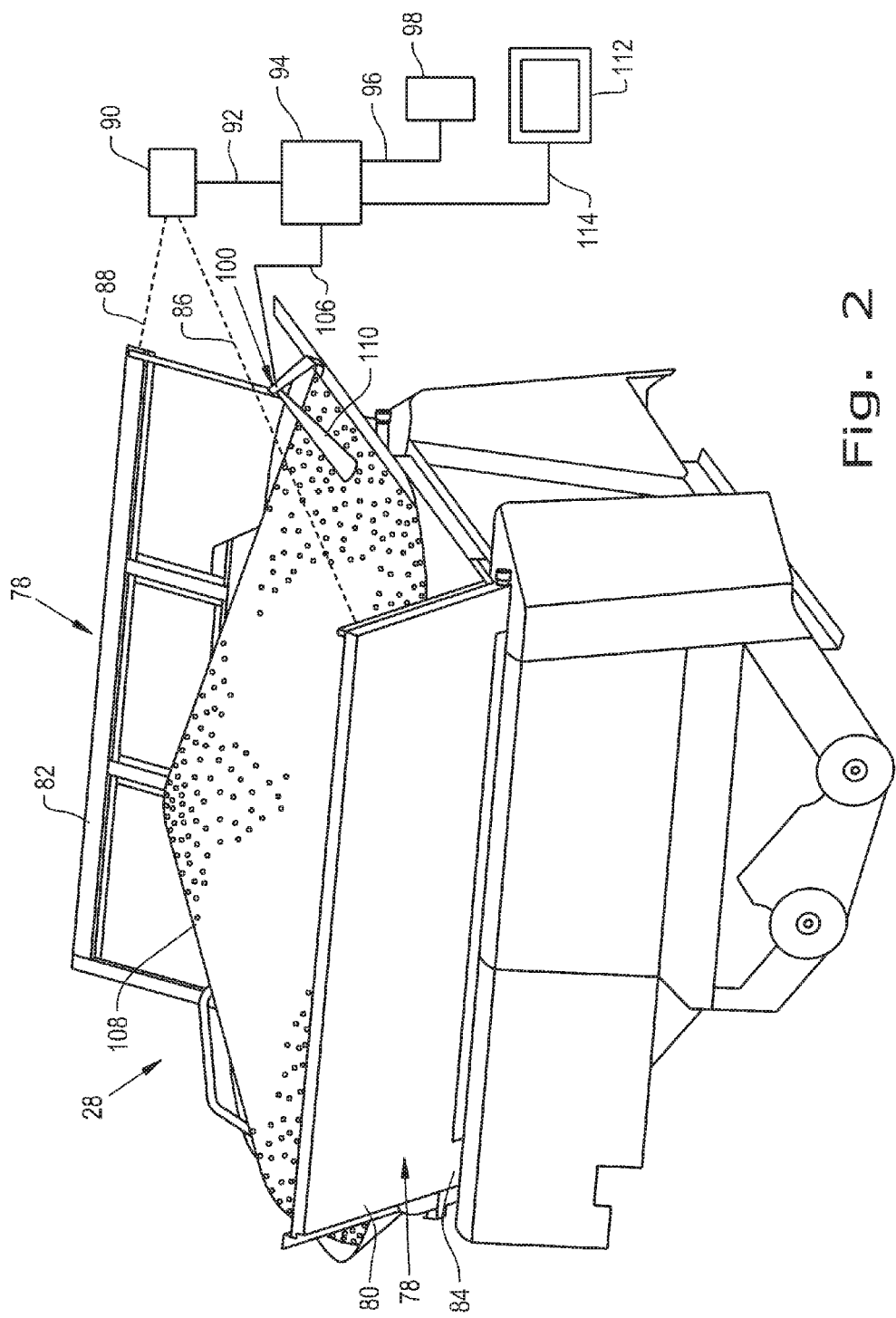
FIG. 2 is a partial perspective view of the combine of FIG. 1, taken in an aft direction.
Figure 3:
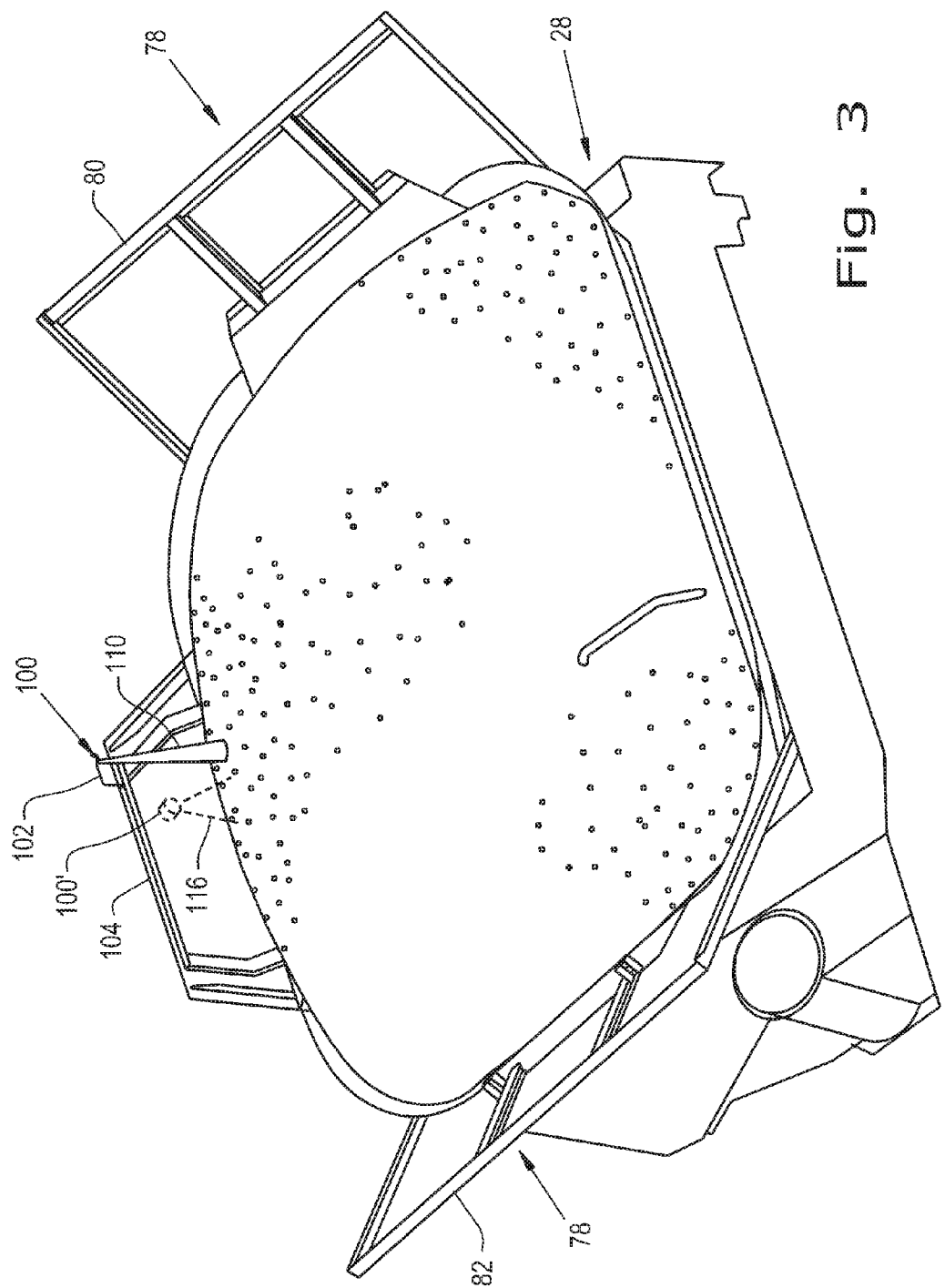
FIG. 3 is a partial perspective view of the combine of FIG. 1, taken in a forward direction.

Referring to FIG. 1 and FIGS. 2 and 3, the grain tank 28 has a cover assembly generally indicated at 78. Specifically referring to FIGS. 2 and 3, the cover assembly 78 includes doors 80 and 82 pivotally connected to the grain tank 28 at 84 and pivotable between the illustrated open position in FIG. 2 and a closed position wherein the upwardly facing open interior of grain tank 28 is covered. Doors 80 and 82 are moved between the illustrated open and the closed position by an actuator 90 through mechanical interconnections, schematically illustrated at 86 and 88.

The actuator 90 and mechanical interconnections may be achieved by a wide variety of forms as apparent to those skilled in the art. The actuator may be hydraulic, electrical or pneumatic. Whatever the form of the actuator and interconnection, the actuator 90 receives inputs via control line 92 from a control unit 94 which functions to provide control signals to actuator 90. Control unit 94 may be in the form of an electronic control unit (ECU) serving other functions in the combine or it may be a single control unit dedicated to actuation of the doors 80 and 82. The control unit 94 receives input from a line 96 connected to an operator control input 98 which may be in the form of a lever or other operator actuated device.

The closing of the doors is necessary to separate the interior of the grain tank from the environment. However, with an operator focusing on the harvesting operation it may not be so apparent that the grain tank is too full to permit closing of the covers 80 and 82. If the covers were actuated in the position of FIG. 2, the impairment of the operation of the actuation mechanism may occur.

In accordance with the present invention, the sensor indicated at 100 is employed to prevent such an occurrence. As shown in FIGS. 2 and 3, sensor 100 is mounted on a bracket 102 supported by an end panel 104. Sensor 100 is an ultrasonic sensor that uses reflected sound waves to determine the distance of an object or objects from the sensors. As shown in FIGS. 2 and 3, sensor 100 is oriented so that it is at right angles to the surface of the conical pile 108 that results when the grain tank 28 is filled. As shown in FIGS. 2 and 3, the sensor 100 is positioned on an end panel 104 at the forward end of grain tank 28. It has been found that a preferred location for the sensor 100 is at the rearward end of grain tank 28 to give reliable results with an interference free location.

In either location, the cone of observation 110 of sensor 100 can project substantially to the bottom of the grain tank 28 so as to give an indication of quantity in the tank, either expressed as a percentage of full or the equivalent quantity of harvested grain. The signal from the ultrasonic sensor 100 is connected to the control unit 94 by a line 106. The control unit may be connected to an operator display 112 by line 114 to show the amount of grain in the tank. In addition to indicating the amount of grain in the grain tank 28, the sensor 100 generates a command signal to the control unit 94 to disable the actuation of the doors 80 and 82 to move them to a closed position. This ensures that the operator, who is focused on the forward motion of the combine does not cause the actuation system to close the doors when the grain tank is full as shown in FIGS. 2 and 3.

The sensor 100 may be provided as a single ultrasonic sensor in which case the sensor 100 reads grain level up to 8 inches from the sensor. This can set a limitation on the position of the sensor. If however, a preferred dual ultrasonic sensor is provided, either as a single component or as two separate components, the limitation on sensing the quantity of grain is lessened so that the sensors may measure grain up to two inches from the sensor 100. This allows the sensor to be positioned closer to the expected full capacity of the grain tank.

This end is achieved by connecting two ultrasonic sensors (shown in FIG. 3) to the controller 94 so that one sensor 100 will be synchronized to transmit the signals and the second sensor 100' to receive the signals. Sensor 100' has a cone of observation 116. The sensors have a common interconnection with the controller 94 so that they receive the same time marker signal. This allows the transmit sensor to transmit and receiving sensor to receive the signal far more rapidly than a single sensor which has internal circuitry limitations on the time before the sensor can switch to the receiving function. This alleviates and reduces the dead band where the height of grain to be measured is closer to the sensor than it can switch to receive mode for the reflected signal. As a result, the existing limitation of a minimum distance of eight inches from the maximum grain pile height may be reduced to two inches.

In addition, the repeat rate of the sensors is reduced to the point where it does not receive reflected signals from the emanating ping. The repeat rate is set by establishing the time within which the transmitted signals would be received based on the distances all the way to the bottom so that signals outside that band such as reflected signals would not be received.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A grain tank level sensing system for a combine for harvesting grain, said combine comprising:
    an upwardly open grain tank fillable with harvested grain;
    a cover actuatable for closing off said open grain tank;
    an actuator for displacing said cover between an open and closed position;
    at least a pair of ultrasonic sensors for continuously detecting the level of grain in said grain tank and generating a signal proportional to the level of grain in the grain tank; and,
    a control system for controlling said actuator to displace said cover between its open and closed position, said control system being responsive to said signal from said ultrasonic sensor indicating a full grain tank to disable said actuator and prevent movement of the cover to the closed position, wherein one of the pair of sensors transmits and the other receives said signal, said sensors being synchronized so that the transmit and receive functions occur substantially below a rate of transmitting and receiving for a single sensor.

2. The grain tank sensing system of claim 1, wherein the cover comprises a pair of doors hinged in a parallel opposed relationship and displaceable between a first position wherein the doors are open and a second position in which the doors close the open top of the grain tank.

3. The grain tank level sensing system of claim 1, wherein the actuator is one of hydraulic, pneumatic and electrical.

4. The grain tank level sensing system of claim 1, wherein the controller is an electronic control unit (ECU).

5. The grain tank level sensing system of claim 4, further comprising an operator control interconnected with the ECU whereby a grain tank full signal prevents any operator signal from causing the actuator to displace the cover.

6. The grain tank level sensing system of claim 1, wherein the grain tank has a forward and rearward end and said ultrasonic sensor is positioned at the rearward end of said grain tank.

7. A grain tank level sensing system for a combine which harvests grain, said combine comprising:
- an upwardly open grain tank fillable with harvested grain;
- at least a pair of ultrasonic sensors for continuously detecting the level of grain in the grain tank and generating a signal proportional to the level of grain in the grain tank; and,
- a control system connected to both of said ultrasonic sensors for generating an output reflecting the level of grain within the tank, wherein one of said sensors transmits and the other sensor receives said signal, said sensors being synchronized so that the transmit and receive functions are substantially below the rate obtainable from a single ultrasonic sensor.

8. The grain tank level sensing system of claim 7, wherein the transmit and receive rate is reduced to the point that signals reflected off walls of the open grain tank are not received.

9. The grain tank level sensing system of claim 7, further comprising a monitor for indicating the level of grain within the grain tank.

\* \* \* \* \*